United States Patent
Tan et al.

(10) Patent No.: US 9,878,406 B2
(45) Date of Patent: Jan. 30, 2018

(54) INDEPENDENT PHASE-CHANGE HEAT-TRANSFER-TYPE HEAT TUBE AND MANUFACTURING METHOD THEREOF

(71) Applicants: ZHUHAI XINGYE NEW ENERGY SCIENCE AND TECHNOLOGY CO., LTD, Zhuhai, Guangdong (CN); ZHUHAI XINGYE GREEN BUILDING SCIENCE AND TECHNOLOGY CO., LTD, Zhuhai, Guangdong (CN)

(72) Inventors: Junyi Tan, Zhuhai (CN); Tingqiao Ye, Zhuhai (CN); Chaofei Zhou, Zhuhai (CN)

(73) Assignees: ZHUHAI XINGYE NEW ENERGY SCIENCE AND TECHNOLOGY CO., LTD, Zhubai (CN); ZHUHAI XINGYE GREEN BUILDING SCIENCE AND TECHNOLOGY CO., LTD, Zhubai (CN)

( * ) Notice: Subject to any disclaimer, the term of this patent is extended or adjusted under 35 U.S.C. 154(b) by 240 days.

(21) Appl. No.: 14/686,750

(22) Filed: Apr. 14, 2015

(65) Prior Publication Data
US 2015/0362259 A1    Dec. 17, 2015

(30) Foreign Application Priority Data

Jun. 17, 2014    (CN) .......................... 2014 1 0267919

(51) Int. Cl.
*F28D 15/02*    (2006.01)
*B23P 15/26*    (2006.01)
*F28D 15/04*    (2006.01)

(52) U.S. Cl.
CPC .......... *B23P 15/26* (2013.01); *F28D 15/0233* (2013.01); *F28D 15/046* (2013.01); *B23P 2700/09* (2013.01); *Y10T 29/49355* (2015.01)

(58) Field of Classification Search
CPC .... B23P 15/26; B23P 2700/09; F28D 15/046; F28D 15/0233; Y10T 29/49355
See application file for complete search history.

(56) References Cited

U.S. PATENT DOCUMENTS 6,357,522 B2 * 3/2002 Dienhart .................. F16L 9/19
138/115
6,463,911 B1 * 10/2002 Treusch ................ F02M 55/04
123/456

(Continued)

OTHER PUBLICATIONS

Tang et al. "Experimental study of oil-filled high-speed spin forming micro-groove fin-inside tubes", International Journal of Machine & Manufacture 47 (2007) 1059-1068.*

*Primary Examiner* — Jun Yoo

(57) ABSTRACT

An independent phase-change heat-transfer-type heat tube and a manufacturing method thereof, wherein the heat tube comprises a housing of which an outer surface is provided with a coating, the housing is provided with an evaporating end and a condensing end opposite to the evaporating end, an inner groove is provided between the evaporating end and the condensing end, a side groove, being separated from the inner groove, is provided in the evaporating end and the condensing end respectively, the inner grooves are separated from each other, the side groove and the inner groove form a plurality of independent cavities which are filled with a working medium.

9 Claims, 1 Drawing Sheet

(56) References Cited

U.S. PATENT DOCUMENTS

| | | | | |
|---|---|---|---|---|
| 7,192,064 | B2* | 3/2007 | Hsu | F28D 15/0283 165/104.26 |
| 2004/0178178 | A1* | 9/2004 | Blohowiak | B05D 5/10 216/89 |
| 2005/0092467 | A1* | 5/2005 | Lin | B82Y 30/00 165/104.26 |
| 2005/0126759 | A1* | 6/2005 | Ueki | F28D 15/0233 165/104.21 |
| 2009/0266514 | A1* | 10/2009 | Agostini | H01L 23/427 165/80.3 |
| 2013/0220844 | A1* | 8/2013 | Logel | B65D 81/265 206/204 |
| 2015/0267966 | A1* | 9/2015 | Lin | F28D 7/0016 165/164 |
| 2015/0348802 | A1* | 12/2015 | Moon | B21C 23/085 29/890.032 |

\* cited by examiner

INDEPENDENT PHASE-CHANGE HEAT-TRANSFER-TYPE HEAT TUBE AND MANUFACTURING METHOD THEREOF

CROSS-REFERENCE TO RELATED APPLICATIONS

The present application claims the benefit of Chinese application No. 201410267919.7 filed on Jun. 17, 2014, the contents of which are hereby incorporated by reference.

TECHNICAL FIELD OF THE INVENTION

The invention relates to a heat-transfer device, in particular to an independent phase-change heat-transfer-type heat tube which can realize independent phase-change heat transfer, and a manufacturing method thereof.

TECHNICAL BACKGROUND OF THE INVENTION

In early 1944, R S Gauler, from General Engine Company in Ohio, USA, first proposed the principle of a heat tube. In 1964, Grover et al from USA independently proposed a heat transfer component similar to that by R S Gauler, and named it as a heat tube, it has been 50 years since then. The applications of the heat tube focused from aerospace to the ground and from industrial applications to civilian products. The heat tube has various shapes and sizes for cooling a chip of an electronic device, the CPU of a notebook computer, a high power transistor, a silicon controlled rectifier, and a heating element in a copier, and for transferring solar heat.

The heat tube, especially the heat tube with a capillary structure, adopts phase change to transfer heat, thus having high thermal conductivity which is higher than that of silver, copper, aluminum and other metal thermal conductors by several orders of magnitude, with the advantages of fast start, sound heat transfer performance, anti-knot scale, reliable use and sound antifreeze property.

At present, a capillary structure within the heat tube has less heat transfer passages. the passage of the capillary structure plays a decisive role in the advantages and disadvantages of the thermal performance of the heat tube, and facilities the change in temperature of each part of the heat tube to be close uniformity, once one of the passages are blocked, and the backflow of the internal working medium encounters too high resistance or generates excessive non-condensable gases, capillary action will not play, and the thermal performance is declined significantly, which is unable to meet the needs of the user.

Therefore, it is necessary to design a better heat tube to solve the above problems.

SUMMARY OF THE INVENTION

The object of the invention is to provide an independent phase-change heat-transfer-type heat tube for utilizing an independent passage to realize independent phase-change heat transfer to improve thermal conductivity, and a manufacturing method thereof.

To achieve the above object, the invention proposes the following technical solution:

An independent phase-change heat-transfer-type heat tube comprises a housing of which an outer surface is provided with a coating, the housing is provided with an evaporating end and a condensing end opposite to the evaporating end, an inner groove is provided between the evaporating end and the condensing end, a side groove, being separated from the inner groove, is provided in the evaporating end and the condensing end respectively, the inner grooves are separated from each other, the side groove and the inner groove form a plurality of independent cavities which are filled with a working medium.

Furthermore, the outer surface of the housing is provided with an anti-corrosion coating conductive coating.

Furthermore, the side groove and two ends of the inner groove form sealing, the vacuum degree in the cavity is decreased to be within the range from 0 to 30 Pa.

Furthermore, the filling volume in the cavity is filled with the working medium with the filling factor within the range from 18% to 40%.

A method for manufacturing an independent phase-change heat-transfer-type heat tube includes:

a. manufacturing an inner groove and a side groove in a housing which are separated from each other, separating the inner grooves from each other, so that the side groove and the inner groove form a plurality of independent cavities;

b. clamping a seal at one end of the housing and sealing the other end of the housing;

c. vacuumizing the cavity, so that the vacuum degree in the cavity is decreased to be within the range from 0 to 30 Pa;

d. filling the cavity with a liquid working medium;

e. erecting the heat tube, heating the bottom of the heat tube and removing non-condensable gases from the cavity.

Furthermore, in Step a, the housing, with a rapid-speed liquid-filling spinning method, manufactures the inner groove and the side groove.

Furthermore, prior to Step b, the housing is bent by 90 degrees, one end of the housing is facilitated to have extending height within the range from 56 mm to 65 mm, in Step b, a bending section is clamped and sealed.

Furthermore, after Step b, a gas source extends into the housing which is carried out with an air-tight test.

Furthermore, in step d, for the filling volume in different cavity volumes, a working medium with the filling factor within the range from 18% to 40% is filled and sealed.

Furthermore, in Step a, anti-corrosion treatment is carried out for the outer surface of the housing, and then the treated housing is cleaned.

Furthermore, after Step e, the heat tube is laid and soaked in an anti-corrosion thermal conductivity coating which is evenly coated on the outer surface of the housing.

Furthermore, the surface of the treated housing is dried with high-pressure air and a desiccant is placed in the housing to remove water vapor from the housing.

Furthermore, the housing can be made of aluminum, stainless steel or other metal materials.

Furthermore, in Step e, when the heat tube is erected, its bottom forms an evaporating end while its tope forms a condensing end, when the heat tube is heated, the evaporating end absorbs heat and conducts the heat to the liquid working medium in the cavity, after reaching its boiling point, the working medium is evaporated, is transferred to the condensing end, is liquefied, and flows back to the evaporating end, thus forming a heating cycle.

The inner groove and the side groove are provided in the housing of the independent phase-change heat-transfer-type heat tube, the side groove and the inner groove are separated from each other, the inner grooves are separated from each other, the side groove and the inner groove form a plurality of independent cavities which are filled with the working medium, the working medium and a core material can be compatible for a long time, separate the cavities of different passages from the liquid working medium, form an independent phase-change heat-transfer passage, and can operate individually not to affect other passages, even if some cavity and a groove passage are extruded to be deformed and cause blockage, the other passages can still work, thereby ensuring the smooth progress of capillary action, improving its thermal conductivity and having sound effect. At the same time, a physical heating method is used to repeat degassing, which also avoids excessive non-condensable gases generated by the liquid working medium in the cavity when the medium has phase change, can ensure the smoothness of the cavity, and further increases the thermal conductivity.

DRAWINGS OF THE INVENTION

DESCRIPTION OF REFERENCES NUMBERS

10: Heat Tube, 11: Housing; 12: Inner Groove; 13: Side Groove; 14: Cavity; 15: Working Medium;

16: Coating; 111: Evaporating End; 113: Condensing End.

Embodiments of the Invention

Figure 1:
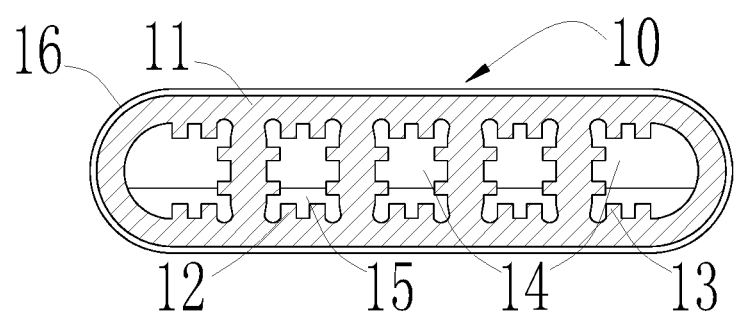
FIG. 1 is a diagram of a transversal cross section of an independent phase-change heat-transfer-type heat tube of the invention.
Figure 2:
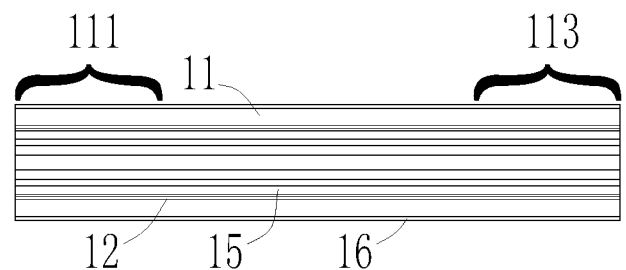
FIG. 2 is a diagram of an axial cross section of an independent phase-change heat-transfer-type heat tube of the invention.

In FIGS. 1-2, an independent phase-change heat-transfer-type heat tube 10 of the invention includes a housing 11 of which an outer surface is provided with a coating 16, preferably, the coating 16 is an anti-corrosion thermal conductivity coating, an appropriate amount of the anti-corrosion thermal conductivity coating is coated on the outer surface of the housing 11, which can not only prevent the outer surface of the housing from being corroded and improve the weather resistance of the heat tube but also improve its conductive performance and have sound effect. The housing 11 has an evaporating end 111 and a condensing end 113 opposite to the evaporating end 111, wherein an inner groove 12 is provided between the evaporating end 111 and the condensing end 113, a side groove 13 is provided in the evaporating end 111 and the condensing end 113 respectively, the side groove 13 is close to part of a side wall of the housing, the side groove 13 and the inner groove 12 are separated from each other, the inner grooves 12 are separated from each other, the side groove 13 and the inner groove 12 form a plurality of independent cavities 14 which are filled with a working medium 15. Normally, the working medium in the heat tube 10 is under liquid state, is placed in the cavity 14 but does not completely fill the cavity 14, after the heat tube 10 is heated, its evaporating end 111 absorbs heat and conducts the heat to the working medium 15 in the cavity 14, after reaching its boiling point, the working medium is boiled and evaporated rapidly, after a short response time, the working medium is transferred to the condensing end 113, is liquefied into liquid and releases a large amount of heat, after its phase change, the working medium 15 between the condensing end 113 and the top end flows back to the evaporating end 111, and then carries out the next heating cycle, thereby forming the phase-change heat-transfer-type heat tube. As a phase-change heat-transfer passage in the heat tube 10 is the cavity 14 which is formed by the mutual separation between the inner groove 12 and the side groove 13, each cavity 14 is separated apart independently and forms a plurality of independent phase-change heat-transfer passages, when capillary action is carried out, each passage can operate individually not to affect other passages, even if some cavity and a groove passage are extruded to be deformed and cause blockage, the other passages can still work, thereby ensuring the smooth progress of the capillary action, improving its thermal conductivity and having sound effect.

A method for manufacturing the above phase-change heat-transfer-type heat tube 10 is as follows:

a. manufacturing an inner groove 12 and a side groove 13 in a housing 11 with a rapid-speed liquid-filling spinning method which are separated from each other, separating the inner grooves 12 from each other, so that the side groove 13 and the inner groove 12 form a plurality of independent cavities 14;

b. clamping a seal at one end of the housing 11, extending a gas source into the housing 11 after the other unclamped end is sealed, and carrying out an air-tight test to avoid air leakage phenomenon;

c. sealing the inner groove 12 and the side groove 13, vacuumizing the cavity, so that the vacuum degree in the cavity 14 is decreased to be within the range from 0 to 30 Pa;

d. filling and sealing a working medium with the filling factor within the range from 18% to 40% according to different cavity volumes, the working medium being water, alcohol, acetone and other liquids with low boiling point and high latent heat;

e. erecting the heat tube 10, and heating the bottom of the heat tube 10, its bottom forming an evaporating end 111 while its top forming a condensing end, after four minutes, tightly clamping the heat tube 10 at the distance from 50 mm to 60 mm away from the top thereof, and removing non-condensable gases in the cavity 14; erecting the heat tube 10 or laying it at a certain inclination angle, wherein when the heat tube is heated, its evaporating end 111 absorbs heat energy and conducts the heat energy to the working medium 15 in the cavity 14, after reaching its boiling point, the working medium is boiled and evaporated rapidly, after a short response time, the working medium is transferred to the condensing end 113, is liquefied into liquid and releases a large amount of heat, thus removing non-condensable gases, increasing the effective length of the condensing end 113 and improving its thermal performance.

Preferably, after Step e, the evaporating end 111 and the condensing end 113 of the heat tube 10 are laid and soaked in an anti-corrosion thermal conductivity coating which is evenly coated on an outer surface of the housing 11, the thickness of the anti-corrosion thermal conductivity coating is controlled to be below 0.1 mm, the surface of the housing 11 is dried with high-pressure air. The anti-corrosion thermal conductivity coating 16 outside of the housing 11 is dried and placed under the working environment for a long time, thus improving the weather resistance of the heat tube 10.

Preferably, in Step a, the surface of the housing 11 is carried out the anti-corrosion treatment, the housing 11 is mostly made of aluminum, stainless steel or other metal materials, and has sound conductivity performance, when the outer surface of the housing 11 is carried out with anti-corrosion treatment, the housing 11 can be prevented from being corroded during the manufacturing. the outer treated surface of the housing 11, the inner groove 12 and the side groove 13 are cleaned, after the housing 11 is dried with high-pressure air, an allochroic desiccant is placed in the housing 11 to remove water vapor from the housing.

Preferably, prior to Step b, the housing 11 is bent by 90 degrees, one end of the housing is facilitated to have extending height within the range from 56 mm to 65 mm. In Step b, a bending section is clamped and sealed.

The independent phase-change heat-transfer-type heat tube 10 of the invention has the following technical effects:

(1) as a phase-change heat-transfer passage in the heat tube 10 is the cavity 14 which is formed by the mutual separation between the inner groove 12 and the side groove 13, each cavity 14 is separated apart independently and forms a plurality of independent phase-change heat-transfer passages, when capillary action is carried out, each passage can operate individually not to affect other passages, even if some cavity and a groove passage are extruded to be deformed and cause blockage, the other passages can still work, thereby ensuring the smooth progress of the capillary action, improving its thermal conductivity and having sound effect.

(2) During the manufacturing of the heat tube 10, a physical heating method is used to repeat degassing, which also avoids excessive non-condensable gases generated by the liquid working medium in the cavity when the medium has phase change, can ensure the smoothness of the cavity, and further increases the thermal conductivity.

(3) The anti-corrosion thermal conductivity coating 16 outside of the housing 11 is dried and placed under the working environment for a long time, thus improving the weather resistance of the heat tube 10.

The above examples only represent one embodiment of the invention, its description is rather concrete and detailed, but it cannot thus be understood that it limits the patent scope of the invention, it shall be pointed out that the person skilled in the art still can make a plurality of variants and improvement without departing from the conception of the invention, which are all within the protection scope of the invention.

What is claimed is:

1. A method for manufacturing an independent phase-change heat-transfer-type heat tube, comprising:
   a. manufacturing a plurality of inner grooves and a side groove in a housing which are separated from each other, separating the inner grooves from each other, so that the side groove and the inner grooves form a plurality of independent cavities which form a plurality of independent phase-change heat-transfer passages, the plurality of independent cavities being formed by mutual separation between the plurality of inner grooves and the side groove;
   b. clamping a seal at one end of the housing and sealing the other end of the housing;
   c. vacuumizing a cavity among the plurality of independent cavities, so that the vacuum degree in the cavity is decreased to be within the range from 0 to 30Pa;
   d. filling the cavity with a liquid working medium;
   e. erecting the heat tube, heating the bottom of the heat tube and removing air from the cavity.

2. The method for manufacturing the independent phase-change heat-transfer-type heat tube according to claim 1, wherein prior to Step b, the housing is bent by 90 degrees, the one end of the housing is facilitated to have extending height within the range of 56 mm-65 mm, in Step b, a bending section is clamped and sealed.

3. The method for manufacturing the independent phase-change heat-transfer-type heat tube according to claim 1, wherein after Step b, a gas source extends into the housing which is carried out with an air-tight test.

4. The method for manufacturing the independent phase-change heat-transfer-type heat tube according to claim 1, wherein in step d, according to different cavity volumes, the working medium with the filling factor within the range from 18% to 40% is filled and sealed.

5. The method for manufacturing the independent phase-change heat-transfer-type heat tube according to claim 1, wherein in Step a, anti-corrosion treatment is carried out for the outer surface of the housing, and then the treated housing is cleaned.

6. The method for manufacturing the independent phase-change heat-transfer-type heat tube according to claim 1, wherein after Step e, the heat tube is laid and soaked in an anti-corrosion thermal conductivity coating which is evenly coated on the outer surface of the housing.

7. The method for manufacturing the independent phase-change heat-transfer-type heat tube according to claim 6, wherein the surface of the treated housing is dried with high-pressure air and a desiccant is placed in the housing to remove water vapor from the housing.

8. The method for manufacturing the independent phase-change heat-transfer-type heat tube according to claim 1, wherein the housing can be made of aluminum, stainless steel or other metal materials.

9. The method for manufacturing the independent phase-change heat-transfer-type heat tube according to claim 1, wherein in Step e, when the heat tube is erected, its bottom forms an evaporating end while its top forms a condensing end, when the heat tube is heated, the evaporating end absorbs heat and conducts the heat to the liquid working medium in the cavity, after reaching its boiling point, the working medium is evaporated, is transferred to the condensing end, is liquefied, and flows back to the evaporating end, thus forming a heating cycle.

* * * * *

UNITED STATES PATENT AND TRADEMARK OFFICE
CERTIFICATE OF CORRECTION

PATENT NO. : 9,878,406 B2
APPLICATION NO. : 14/686750
DATED : January 30, 2018
INVENTOR(S) : Junyi Tan et al.

It is certified that error appears in the above-identified patent and that said Letters Patent is hereby corrected as shown below:

On the Title Page

Item (73), the correct city of the Assignees should be "Zhuhai" instead of "Zhubai".

Signed and Sealed this
Tenth Day of April, 2018

Andrei Iancu
*Director of the United States Patent and Trademark Office*